United States Patent
Cervantes

(10) Patent No.: US 11,780,284 B2
(45) Date of Patent: Oct. 10, 2023

(54) VEHICLE COMPRISING A CONTROLLED VERTICAL POSITION CHASSIS, IN ORDER TO BE LOWERED INTO A LOW POSITION SUPPORTED ON THE GROUND

(71) Applicant: COMMISSARIAT A L'ENERGIE ATOMIQUE ET AUX ENERGIES ALTERNATIVES, Paris (FR)

(72) Inventor: Valery Cervantes, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 17/791,431

(22) PCT Filed: Jan. 4, 2021

(86) PCT No.: PCT/FR2021/050002
§ 371 (c)(1),
(2) Date: Jul. 7, 2022

(87) PCT Pub. No.: WO2021/140290
PCT Pub. Date: Jul. 15, 2021

(65) Prior Publication Data
US 2023/0038742 A1   Feb. 9, 2023

(30) Foreign Application Priority Data

Jan. 8, 2020   (FR) ........................................ 2000123

(51) Int. Cl.
*B60G 17/017* (2006.01)
*B60T 7/00* (2006.01)

(52) U.S. Cl.
CPC ........ *B60G 17/017* (2013.01); *B60G 2500/30* (2013.01); *B60T 7/00* (2013.01)

(58) Field of Classification Search
CPC .................................................... B60G 17/017
See application file for complete search history.

(56) References Cited

U.S. PATENT DOCUMENTS

| 4,145,073 A | 3/1979 | McLuckie et al. |
| 2003/0047899 A1 | 3/2003 | Gibbs |

(Continued)

FOREIGN PATENT DOCUMENTS

| WO | WO 01/74612 A1 | 10/2001 |
| WO | WO 2004/106110 A1 | 12/2004 |

OTHER PUBLICATIONS

International Search Report dated Apr. 23, 2021 in PCT/FR2021/050002 filed Jan. 4, 2021, citing documents AA-AB and AO-AP therein, 2 pages.

(Continued)

*Primary Examiner* — Paul N Dickson
*Assistant Examiner* — Shams Dhanani
(74) *Attorney, Agent, or Firm* — Oblon, McClelland, Maier & Neustadt, L.L.P.

(57) ABSTRACT

A vehicle including a controlled vertical position chassis, in order to be able to be moved into a low position supported on the ground, and, associated with each wheel, a suspension arm, an arm actuator, and a safety device capable of limiting the accidental lowering of the chassis, the device being able to adopt an active state wherein the rotation of the suspension arm can be limited, the device including an actuator, a cylinder of which is mounted on the chassis and a piston of which is mounted on the suspension arm, or vice versa, the actuator defining a first chamber connected to a first and a second fluid passage through the cylinder, the second passage being connected to a first fluid pipe fitted with a safety valve.

18 Claims, 15 Drawing Sheets

(56) References Cited

U.S. PATENT DOCUMENTS

| | | | |
|---|---|---|---|
| 2021/0061040 A1* | 3/2021 | Coombs | B60G 17/019 |
| 2021/0309193 A1* | 10/2021 | Rathke | B60T 8/1837 |
| 2022/0281456 A1* | 9/2022 | Giovanardi | B60W 30/16 |
| 2022/0402482 A1* | 12/2022 | Sandrasekaran | B60G 17/0185 |

OTHER PUBLICATIONS

Preliminary French Search Report dated Sep. 28, 2020 in French Patent Application 2000123 filed Jan. 8, 2020, citing documents AA and AO-AP therein, 2 pages (with Translation of Category of Cited Documents).

* cited by examiner

VEHICLE COMPRISING A CONTROLLED VERTICAL POSITION CHASSIS, IN ORDER TO BE LOWERED INTO A LOW POSITION SUPPORTED ON THE GROUND

The invention relates to the field of vehicles in which the chassis is controllable so that it can be moved between a high running position and a low position in which the chassis is supported on the ground.

The invention preferably relates to delivery vehicles having a cargo loading space, and even more preferably to urban delivery trucks.

On this type of vehicle, the lowerable character of the chassis makes it possible to facilitate cargo loading and unloading operations. Indeed, when the chassis adopts its low position supported on the ground, the cargo loading space is located as close to the ground as possible. The handling of cargo, in particular the handling necessary for its delivery, is advantageously simplified.

Such a vehicle has multiple wheels and, associated with each wheel, a pivoting wheel suspension arm on the chassis. A suspension arm actuator is also associated with each wheel, and is arranged between the suspension arm and the chassis. The actuator makes it possible to control an angular position of the arm with respect to the chassis, in order to vary the vertical position of the chassis. Different technologies are possible for the production of the actuator. However, in the event of a failure of the actuator during running, for example after a loss of pressure in the actuator, there is a risk that the chassis of the moving vehicle will fall and strike the ground accidentally. To overcome this disadvantage, technical solutions have been envisaged which provide retractable mechanical stops that, in the active position, make it possible to limit the lowering of the chassis so that it does not accidentally strike the ground. The active position of the mechanical stops is adopted while the vehicle is running. These stops are placed in the inactive position when the vehicle is stopped, before the chassis is lowered, in order to bring it to its low position supported on the ground.

Nevertheless, there is a need to simplify the design of these safety stops, as well as a need to improve the reliability thereof, and also a need to reduce the bulk thereof. There is also a need to improve the design of these stops in order to make the remotely controllable, for example from the driver's seat in order to facilitate the lowering procedure.

To respond at least partially to these needs, the invention relates to a vehicle comprising a controlled vertical position chassis, in order to be moved between a high running position and a low position in which the chassis is supported on the ground, the vehicle also including a plurality of wheels, and, associated with each wheel:
- a wheel-bearing suspension arm, the arm being pivotably mounted on the chassis;
- a suspension arm actuator, arranged between the suspension arm and the chassis, the actuator making it possible to control an angular position of the arm relative to the chassis, in order to vary the vertical position of the chassis,
- a safety device capable of limiting the accidental lowering of the chassis, the device being capable of adopting, on the one hand, an active state in which it makes it possible to limit the rotation of the suspension arm, in a first direction leading to the lowering of the chassis, to a safety position of this arm, and, on the other hand, an inactive state in which it allows the rotation of this arm in the first direction, beyond the safety position.

According to the invention, the safety device comprises a jack having a cylinder mounted on the chassis and a piston mounted on the suspension arm, or vice versa, the jack defining a first chamber communicating with a first and a second fluid passage through the cylinder, spaced apart from one another in a direction of sliding of the piston in the cylinder so that the second passage is located as close as possible to a bottom of the first chamber defined by the cylinder, the second passage communicating with a first fluid duct provided with a safety valve adopting:
- an open position in the inactive state of the safety device, so as to allow the fluid to be discharged from the first chamber through the second passage, when the piston moves toward the bottom of the first chamber due to the rotation of the suspension arm in said first direction; and
- a closed position in the active state of the safety device, so that when the piston moves toward the bottom of the first chamber, due to the rotation of the suspension arm in said first direction, the piston is locked in a safety position at a distance from the bottom of the first chamber, in which position the fluid is compressed between the piston head and the safety valve.

The invention thus offers a simple, reliable, and compact solution, making it possible to prevent the accidental lowering of the chassis to the ground. Indeed, in the event of a failure of an actuator associated with one of the wheels, the weight of the chassis and the load of the vehicle cause the suspension arm to rotate in the first direction. The undesired rotation of the suspension arm causes the piston of the safety device to move toward the bottom of the first chamber of the jack. When the piston head reaches the first fluid passage formed through the cylinder, the fluid can no longer escape from the first chamber of the jack, because the safety valve associated with the second fluid passage is in a closed position, reflecting an active state of the safety device. This causes the piston to be locked in the safety position at a distance from the bottom of the first chamber, which locking stops the accidental rotation of the suspension arm. The latter then advantageously remains held in the safety position, preventing contact between the chassis and the ground, by virtue of the pressurization of the fluid between the piston head of the safety device and the safety valve in the closed position.

Finally, it is noted that this design, specific to the invention, is also advantageous in that the safety device can be controlled remotely, for example from the driver's seat in order to facilitate the procedure of lowering the chassis.

The invention preferably includes at least one of the following optional features, taken individually or in combination.

Associated with each wheel, the vehicle has a damper arranged between the chassis and the wheel suspension arm.

According to a first embodiment of the invention, the damper is formed by an element distinct from the safety device.

According to a second preferred embodiment of the invention, the safety device is integrated in the damper, the latter comprising a jack formed by the jack of the safety device. By integrating the damping function in the safety device, the overall bulk as well as the weight are even further reduced.

Preferably, the jack defines a second chamber separated from the first chamber by the piston head, the second chamber communicating with a third fluid passage through the cylinder, and downstream of the safety valve in the direction of flow going from the second passage to the safety valve, the first fluid duct communicates, on the one hand, with a second fluid duct connected to the first passage, and, on the other hand, with a fluid circuit.

According to an embodiment, the fluid circuit communicates with the third fluid passage through the cylinder.

According to another embodiment, the fluid circuit communicates with the third fluid passage of the jack belonging to the safety device associated with the wheel of the vehicle located opposite in a transverse direction of the vehicle. This advantageously makes it possible to confer an anti-roll function on the vehicle, by virtue of the interaction between the safety devices of two transversely opposed wheels in the same running gear. In addition, by rebalancing the transversely opposite wheel, the risk of loss of grip at the diametrally opposite wheel is also reduced.

Preferably, the fluid circuit includes a non-return valve associated with a compression fluid through-opening, as well as a duct for bypassing the compression fluid through-opening, the bypass duct being equipped with a second non-return valve associated with an expansion fluid through-opening, the second non-return valve allowing a flow of fluid in the direction opposite that of the first non-return valve, and the compression fluid through-opening having a different flow cross-section from that of the expansion fluid through-opening. By virtue of this design in which the damping function is integrated in the safety device, a differentiated damping in compression and in rebound is advantageously obtained.

Preferably, the fluid circuit includes a fluid tank with an air reserve.

Preferably, the suspension arm actuator is an air bag having a longitudinal axis merging with an axis of the jack of the safety device, a longitudinal end of the air bag being secured to one of the two elements of the jack among the cylinder and the piston, the other of the two elements of the jack being mounted on one of the two entities among the suspension arm and the chassis, and the opposite longitudinal end of the air bag being mounted on the other of the two entities among the suspension arm and the chassis. This arrangement advantageously makes it possible to preserve an appropriate orientation of the air bag for the transfers of mechanical stresses between the chassis and the suspension arm, regardless of the angular position of the latter. Preferably, the jack is a hydraulic jack, but other jack technologies can still be envisaged without going outside the scope of the invention.

Preferably, each wheel has a rim and a tire, as well as a reinforcement arranged around the rim and intended come into contact with a tread of the tire in the event of a pressure loss. This reinforcement advantageously constitutes a safety feature for preventing the risk of accidental lowering of the chassis to the ground, in the event of a loss of pressure of the tire.

Preferably, the vehicle includes at least one of the following features, and even more preferably a plurality of these features, or even all of them:
  the vehicle includes only two running gears, namely a front running gear and a rear running gear each preferably equipped with only two single-wheel assemblies, each of these wheels being individually articulated on the chassis by its suspension arm;
  the vehicle has, in the running configuration, a ground clearance of less than 500 mm;
  when viewed from below, the centre of gravity of the loaded vehicle is located behind a wheelbase midpoint between a front running gear and a rear running gear;
  the vehicle has a cargo loading space, and is preferably an urban delivery truck.

According to another preferred embodiment of the invention, the vehicle also includes, associated with each wheel, a device for preventing rotation of its suspension arm, the device for preventing rotation being configured to prevent the rotation of the suspension arm with respect to the chassis in both directions of rotation, when the chassis is in the low position supported on the ground. Consequently, when the ground is not flat and only a portion of the chassis is supported on the ground, the risks of unwanted movements of the chassis in the low supported position are advantageously prevented by the devices for preventing rotation.

Such unwanted movements of the chassis are, for example, possible during loading or unloading of the vehicle, due to a change in position of the centre of gravity. The portion of the chassis not in contact with the ground is then capable of approaching the ground as a result of these unwanted movements, with a risk to people located near the vehicle, such as, for example, a risk of a foot being crushed between the ground and the portion of the chassis approaching the ground. By virtue of the device for preventing rotation specific to this embodiment, such risks are avoided.

Preferably, the device for preventing rotation of the suspension arm is a blocking valve forming an integral part of the fluid circuit of the safety device, this valve preventing, in a blocking position, the movement of the piston in the cylinder, in both of the sliding directions thereof. This design makes it possible for the safety device to satisfy another function of preventing rotation of the suspension arm in the low supported position of the chassis, this function being capable of being combined with the previous ones. Nevertheless, this function of preventing rotation of the suspension arm can be applied differently, for example by providing an analogous blocking valve on a damper distinct from the safety device.

According to yet another possibility, a brake may be attached to the axis of rotation of the suspension arm with respect to the chassis. In this case, a drum brake can be used, for example capable of being activated by an electrical actuator.

According to yet another preferred embodiment of the invention, for each wheel of the vehicle, in the high running position of the chassis:
  its suspension arm has an arm rotation axis with respect to the chassis;
  the wheel has a wheel rotation axis with respect to the suspension arm, the two arm rotation and wheel rotation axes being parallel or substantially parallel;
  its suspension arm has an arm length defined between the arm rotation and wheel rotation axes;
  the arm rotation axis has a first vertical distance to the ground;
  the wheel rotation axis has a second vertical distance to the ground; and
  the wheel includes a tread having a wheel diameter.
In addition, for all of the wheels:
  the arm rotation axis is longitudinally offset from the wheel rotation axis in the same direction;
  the arm length is the same or substantially the same;
  the first vertical distance to the ground is the same or substantially the same;
  the second vertical distance to the ground is the same or substantially the same; and
  the wheel diameter is the same or substantially the same.

By virtue of this design, the lowering of the chassis to its low position supported on the ground does not generate any stress in the running gears, even when the wheels are locked by a parking brake. This is explained by the identity of the kinematics implemented at each wheel, which confers an identical or substantially identical longitudinal offset of the chassis with respect to the ground, when the chassis is being lowered.

Finally, the invention also relates to a method for lowering a vehicle chassis as described above to the ground, comprising a step of switching the safety valve of each wheel from its closed position to its open position, then a step of controlling the actuators in order to lower the chassis toward the ground.

Preferably, the lowering method is implemented for a vehicle including only two running gears, namely a front running gear and a rear running gear, each wheel of the running gears being associated with a parking brake, the method including the following series of steps:
  when the chassis is in the high running position, actuation of the parking brake only for all of the wheels of one of the two running gears;
  lowering of the chassis to its low position supported on the ground; and
  actuation of the parking brake for all of the wheels of the other of the two running gears.

This method also makes it possible to lower the chassis to its low position supported on the ground, without generating any stress in the running gears by virtue of the sequenced management of the parking brake on the wheels. The lowering of the chassis can thus be performed without stress, regardless of the kinematics associate with each of the suspension arms, with the guarantee that the vehicle will remain stationary by virtue of the parking brake applied to the wheels of one of the two running gears during this lowering.

Other advantages and features of the invention will appear in the non-limiting detailed description that follows.

This description will be provided with reference to the appended drawings, wherein.

Figure 4:
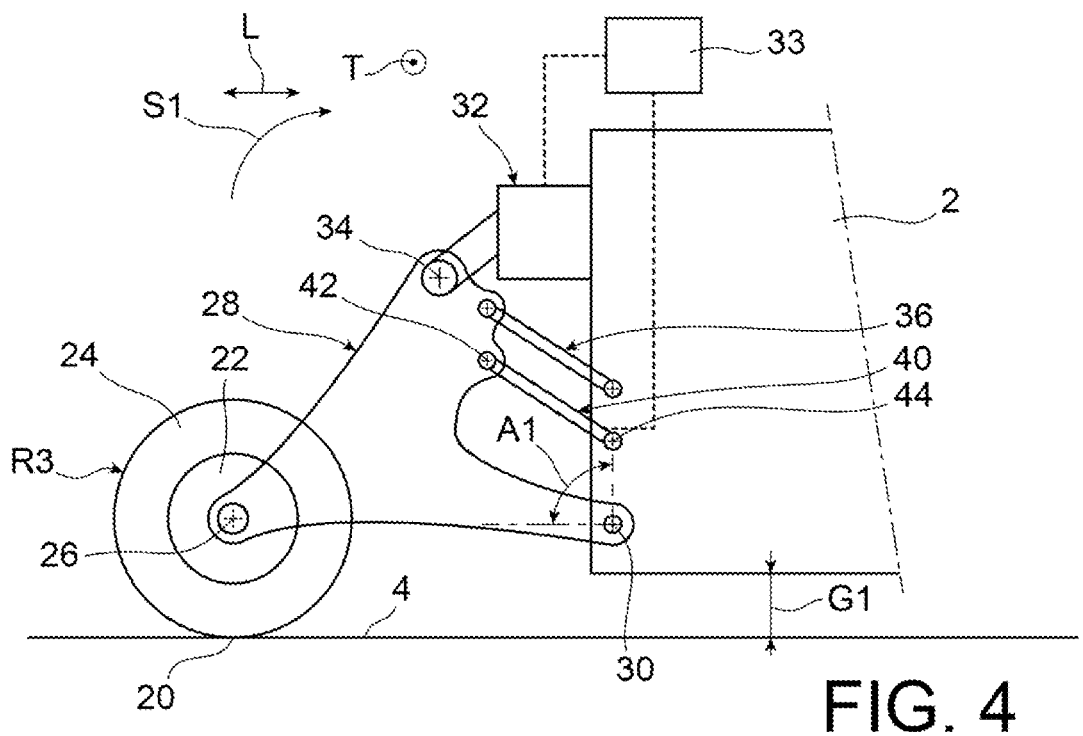
FIG. 4 shows a more detailed side view of a portion of the vehicle in a first preferred embodiment of the invention, with the chassis in the high running position.
Figure 5:
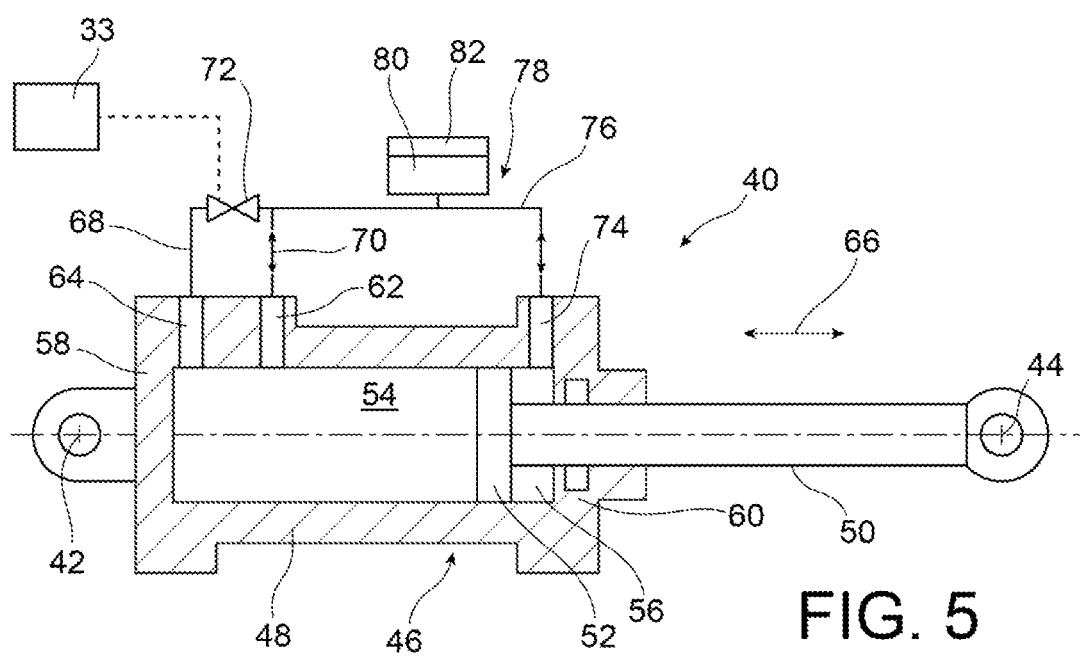
FIG. 5 shows a safety device for preventing the risk of accidental lowering of the chassis to the ground, the safety device being associated with the wheel illustrated in FIG. 4, and shown in an active state as adopted with the chassis in the high running position of FIG. 4.
Figure 6:
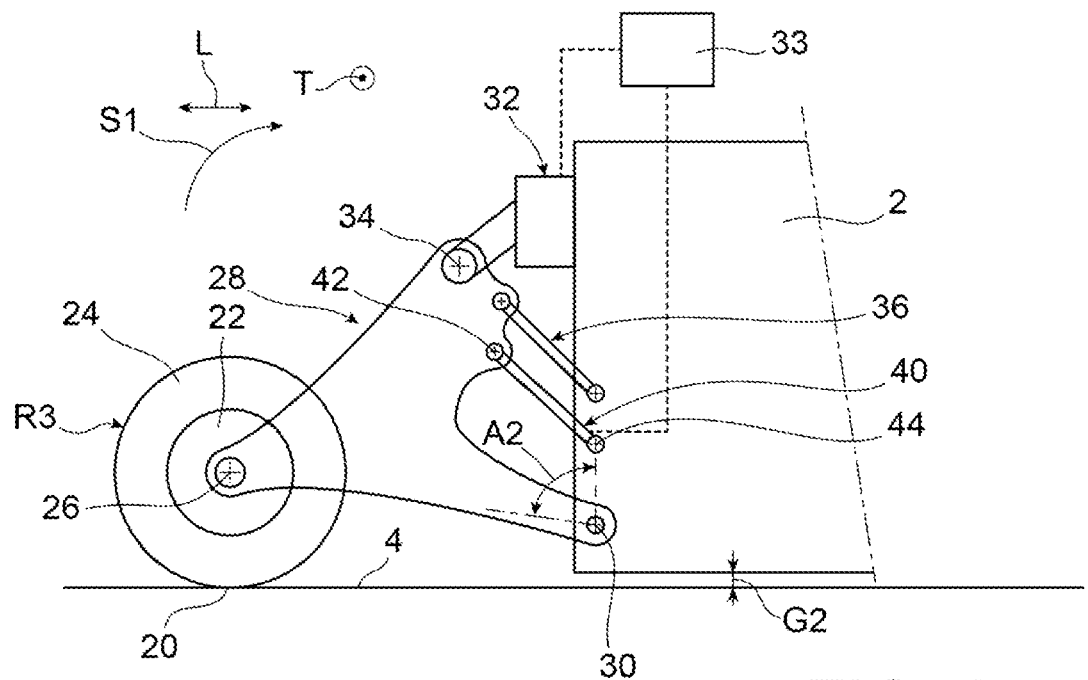
FIG. 6 shows a view similar to that of FIG. 4, with the wheel suspension arm in the safety position.
Figure 6:
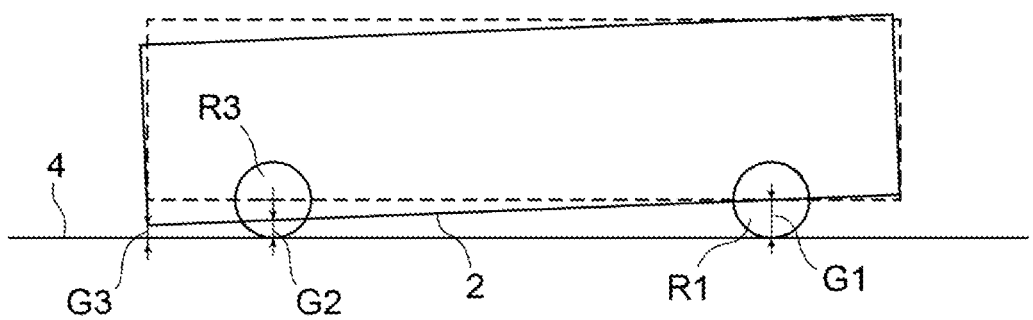
Figure 7:
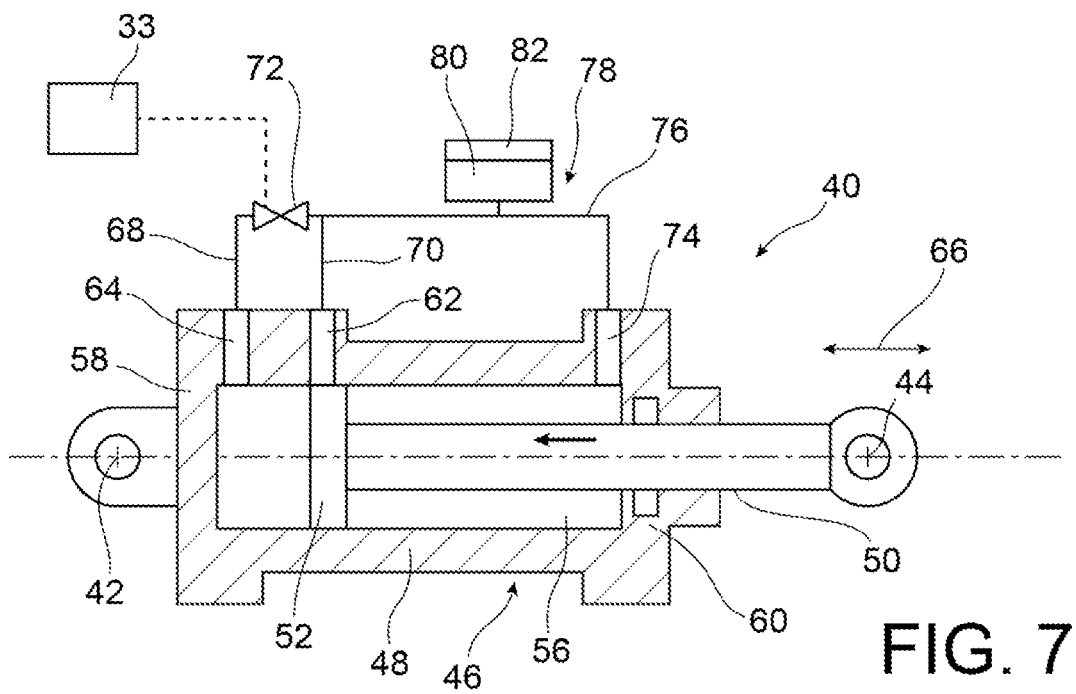
Figure 8:
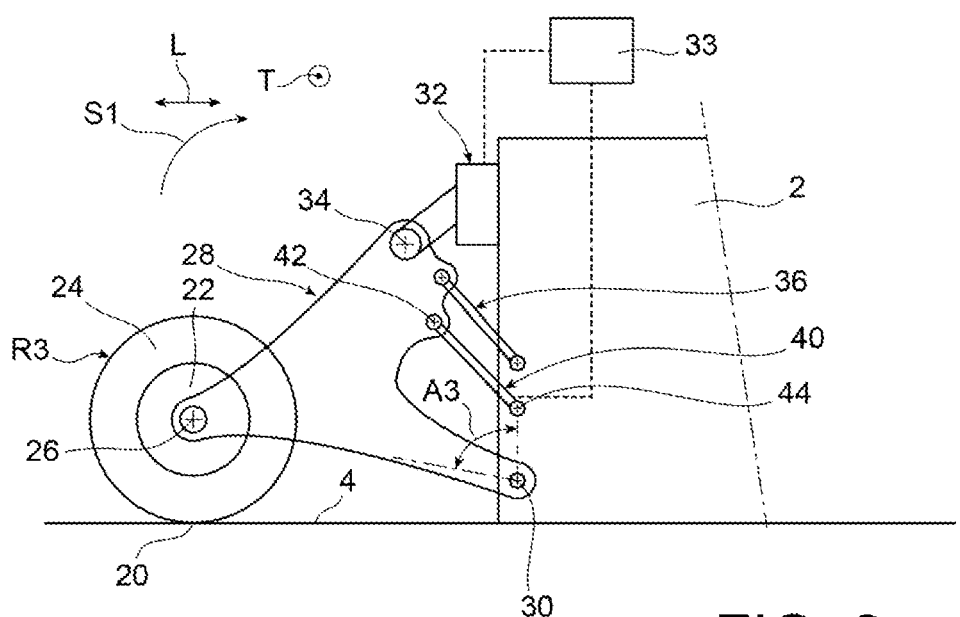
Figure 9:
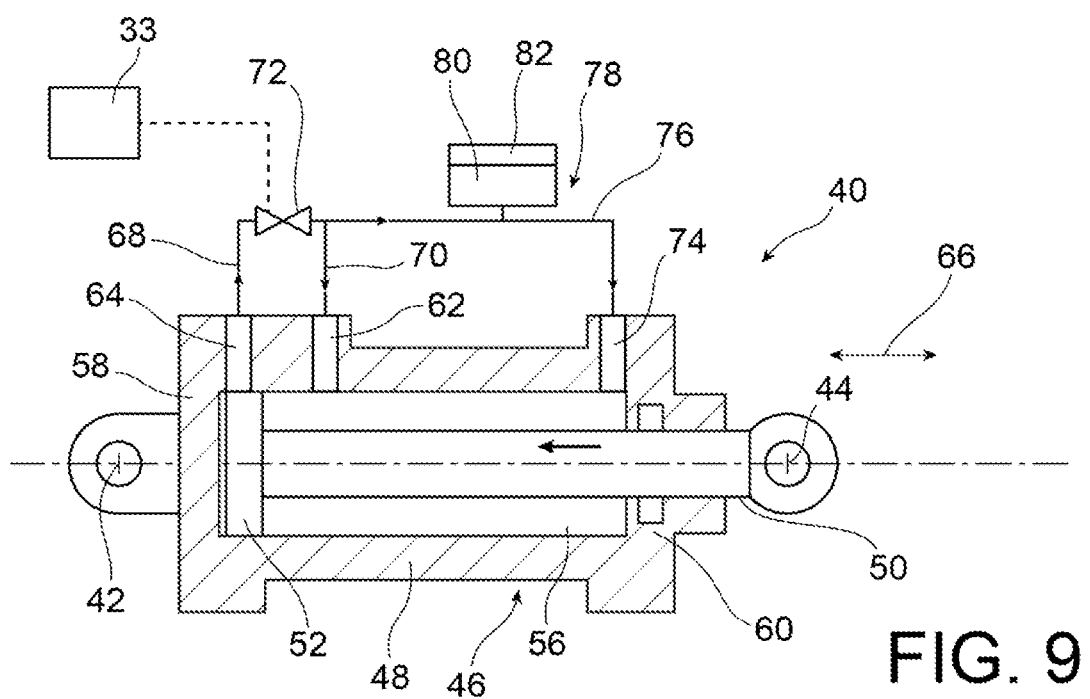
Figure 10:
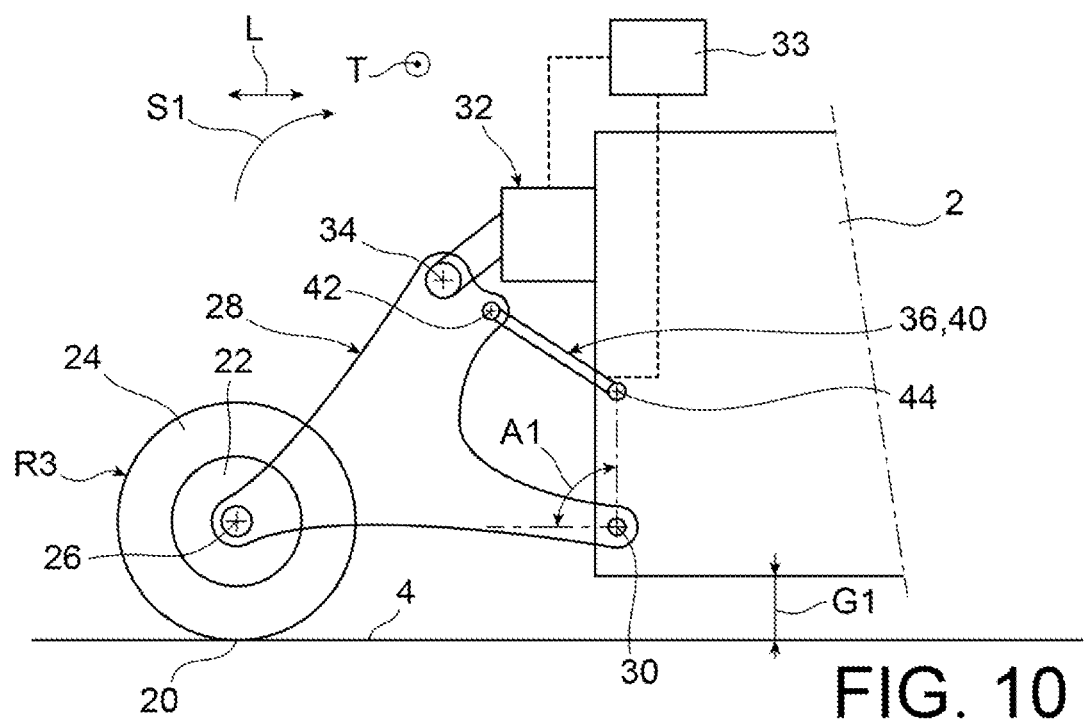
Figure 11:
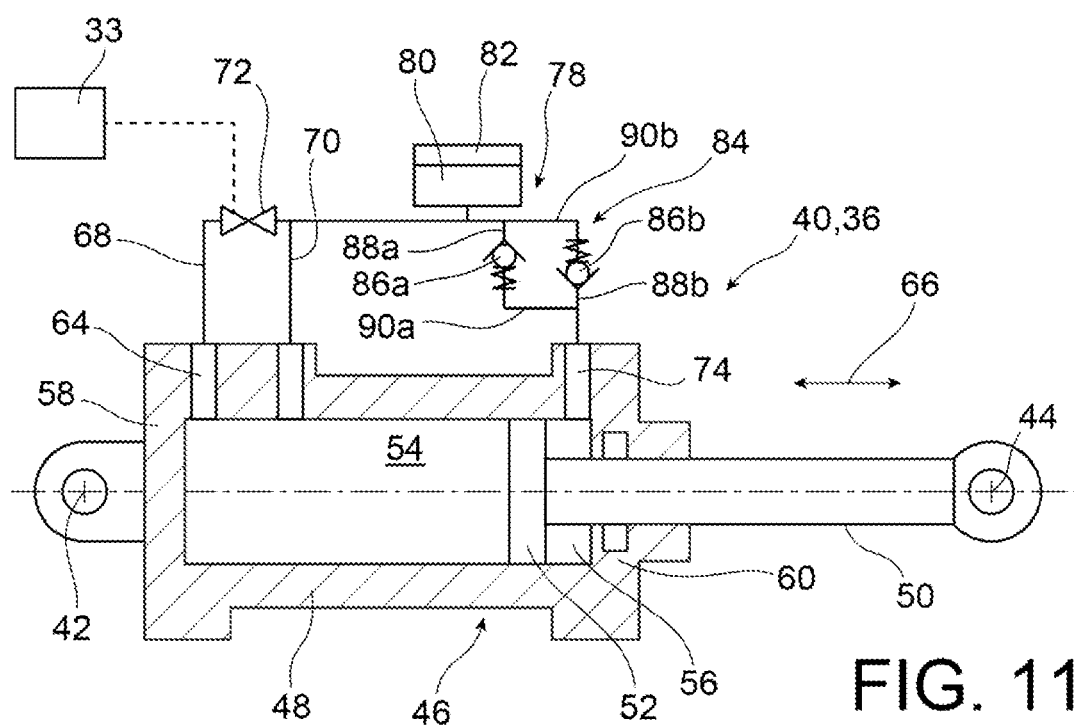
Figure 12:
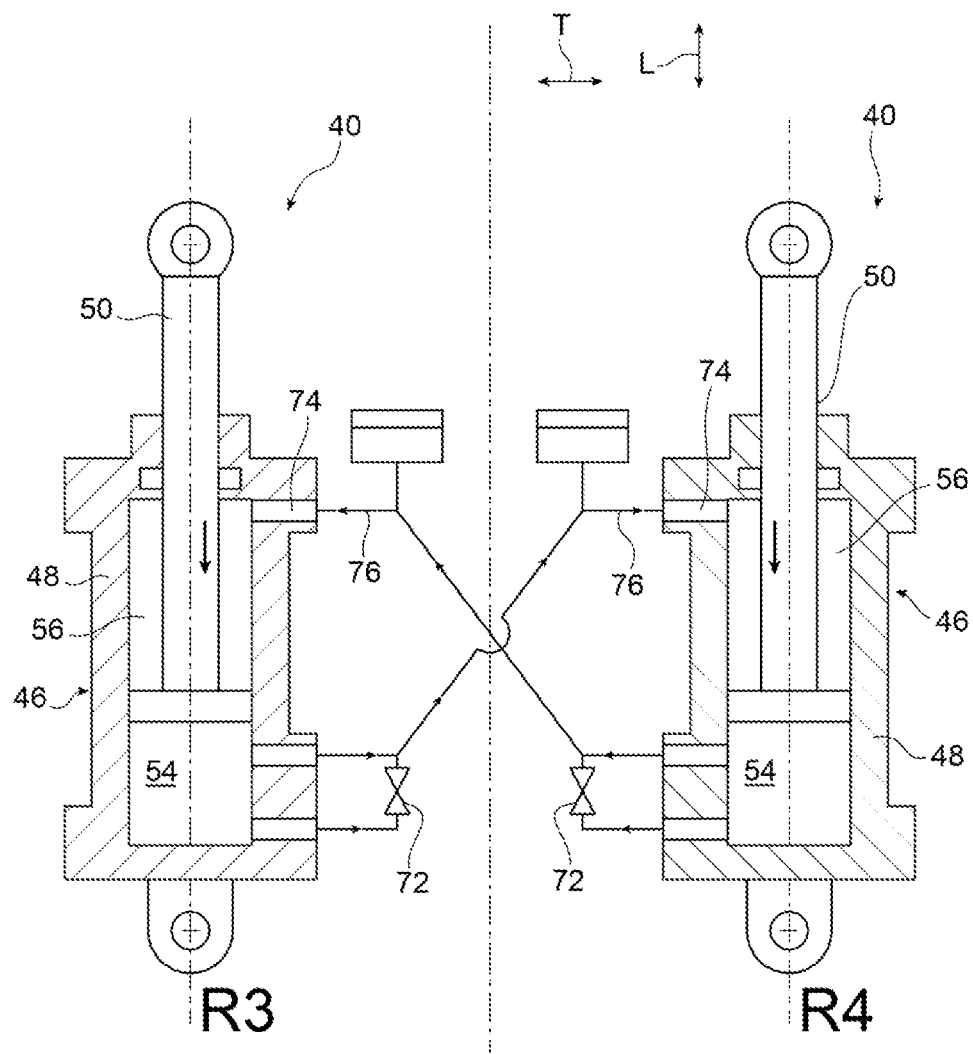
Figure 13:
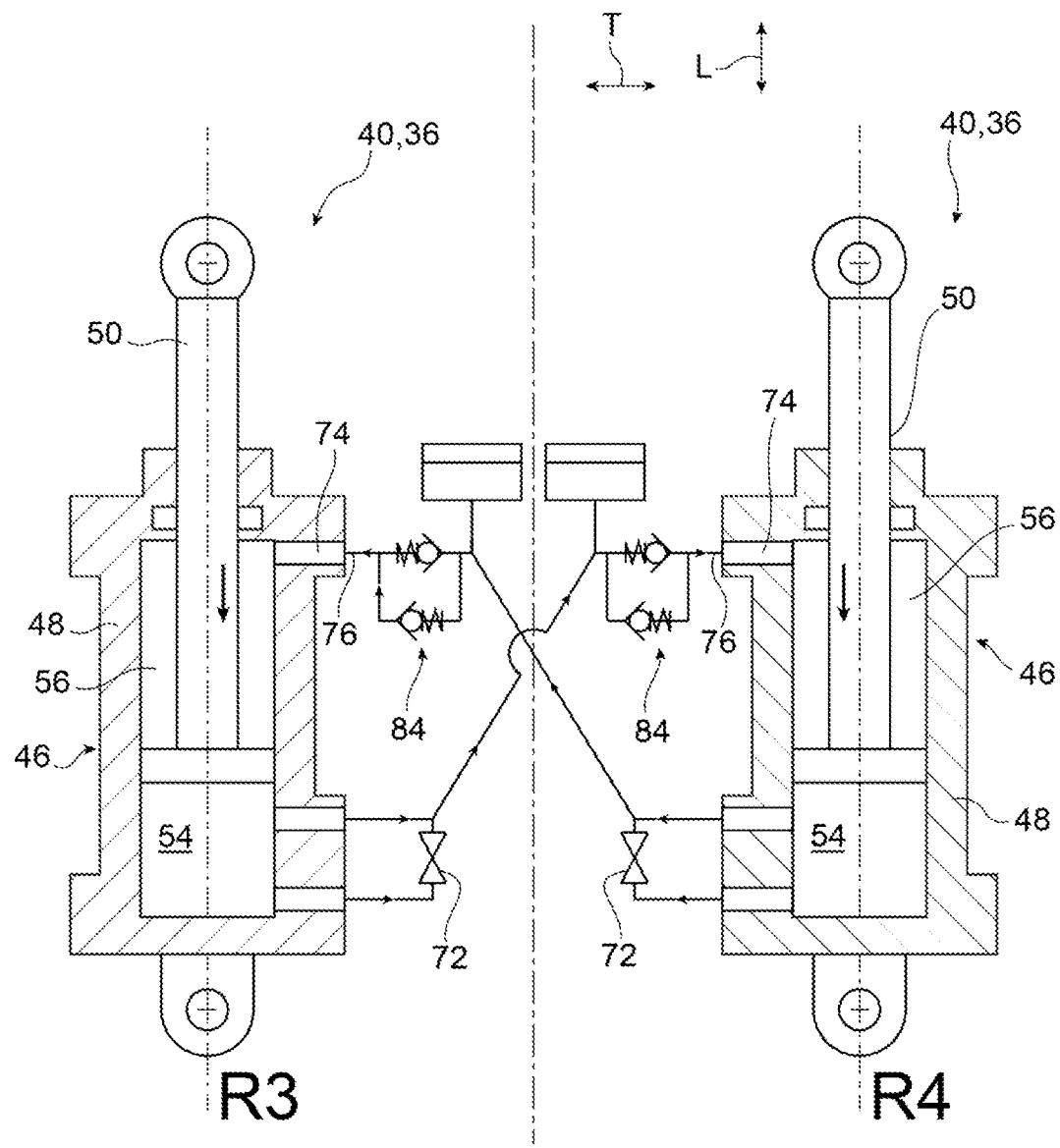
Figure 14:
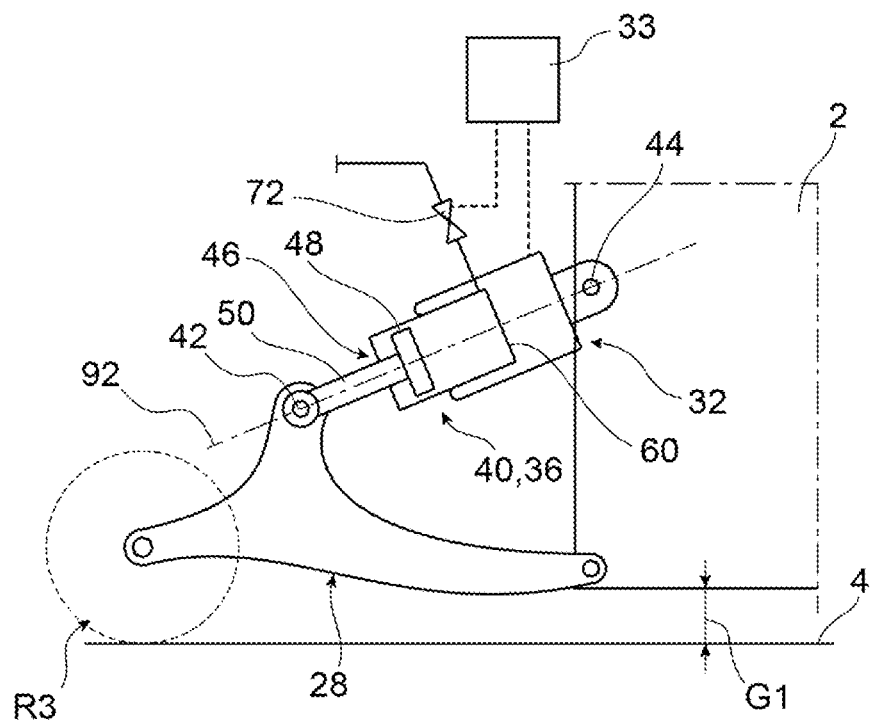
Figure 15:
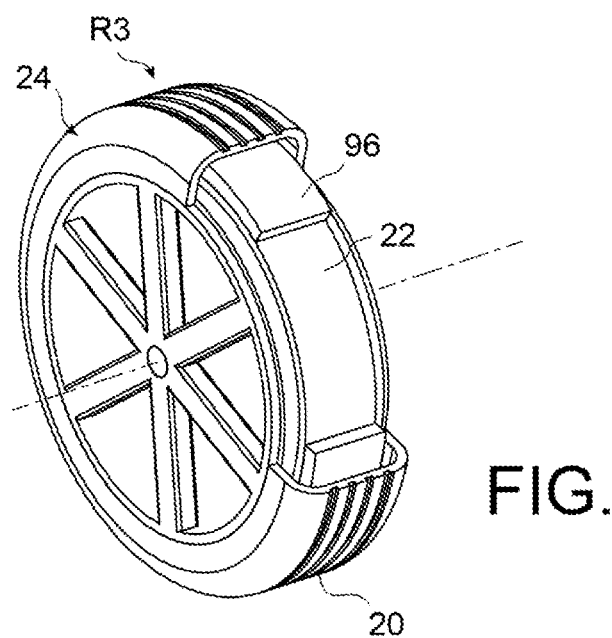
Figure 16:
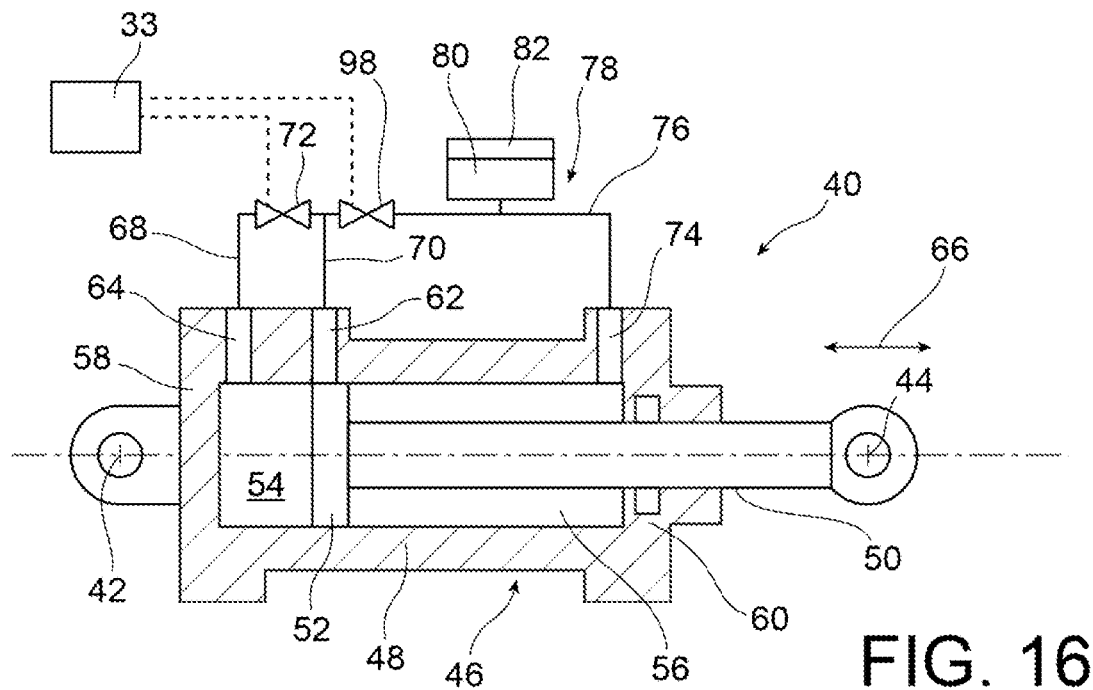
Figure 16A:
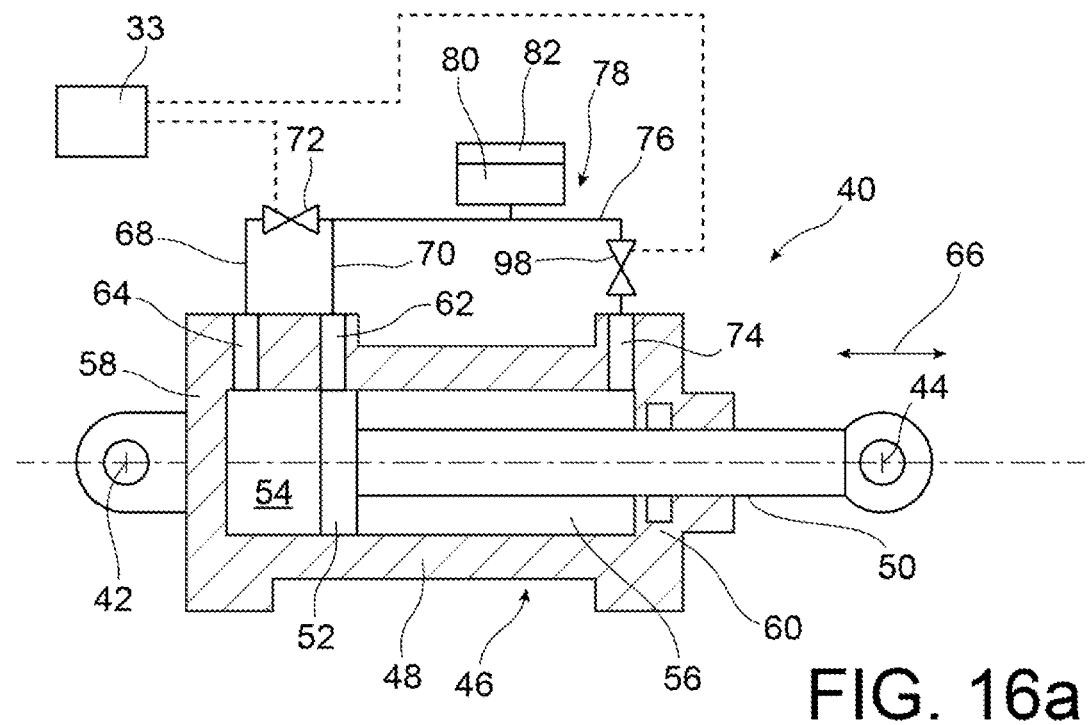
Figure 17:
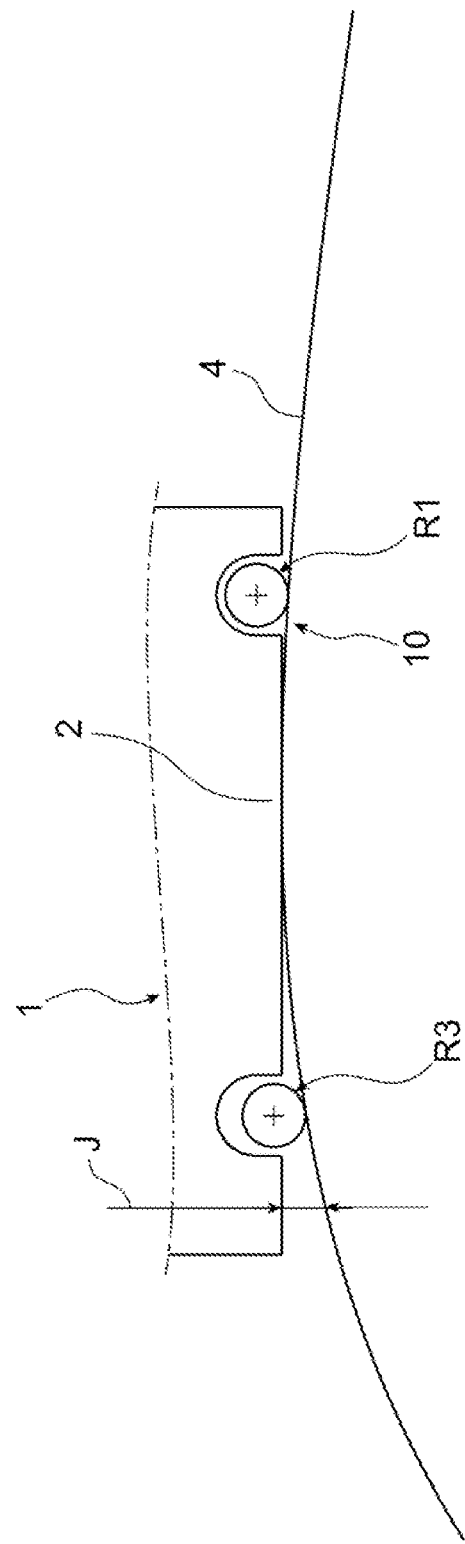
Figure 18:
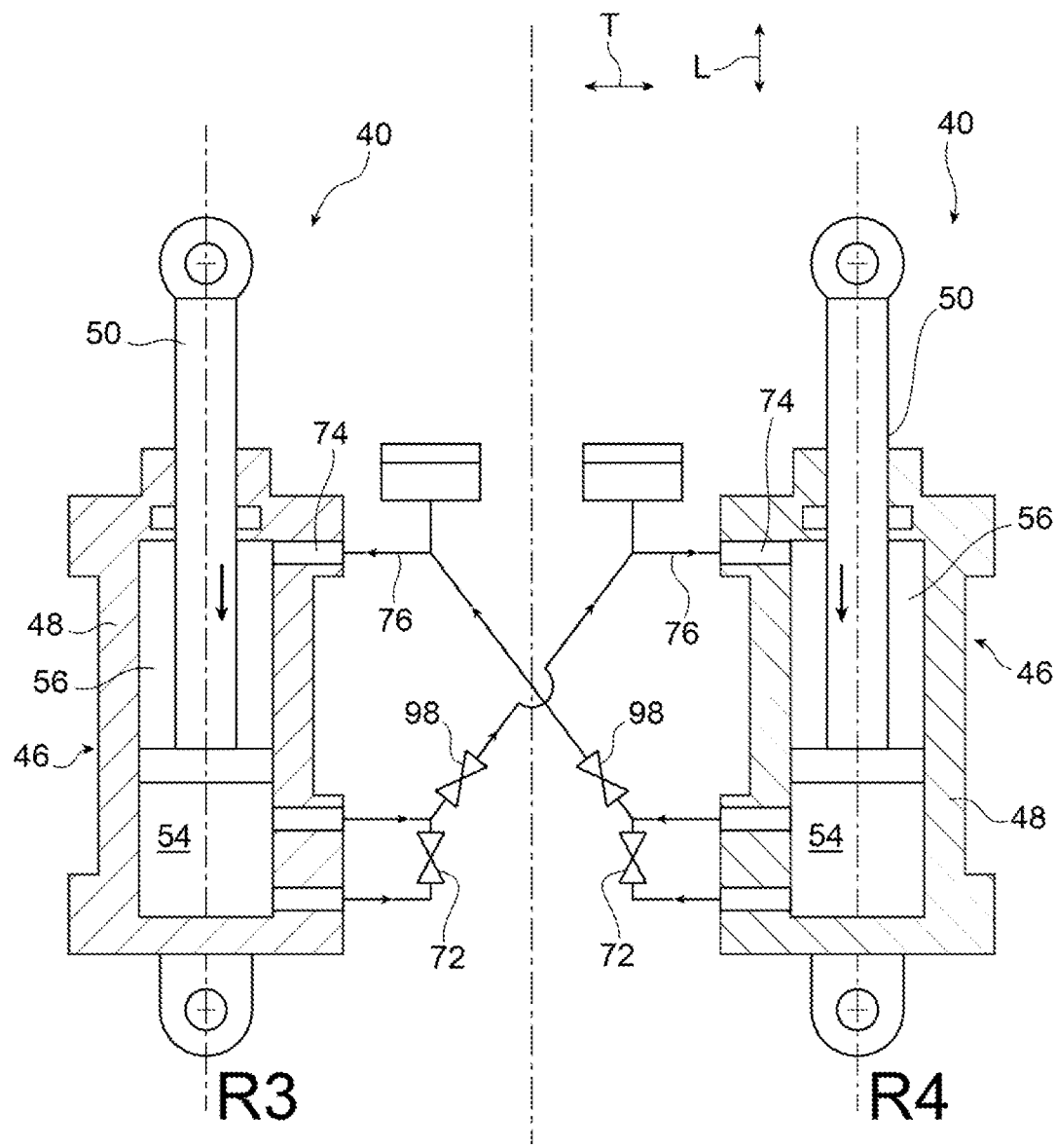
Figure 19:
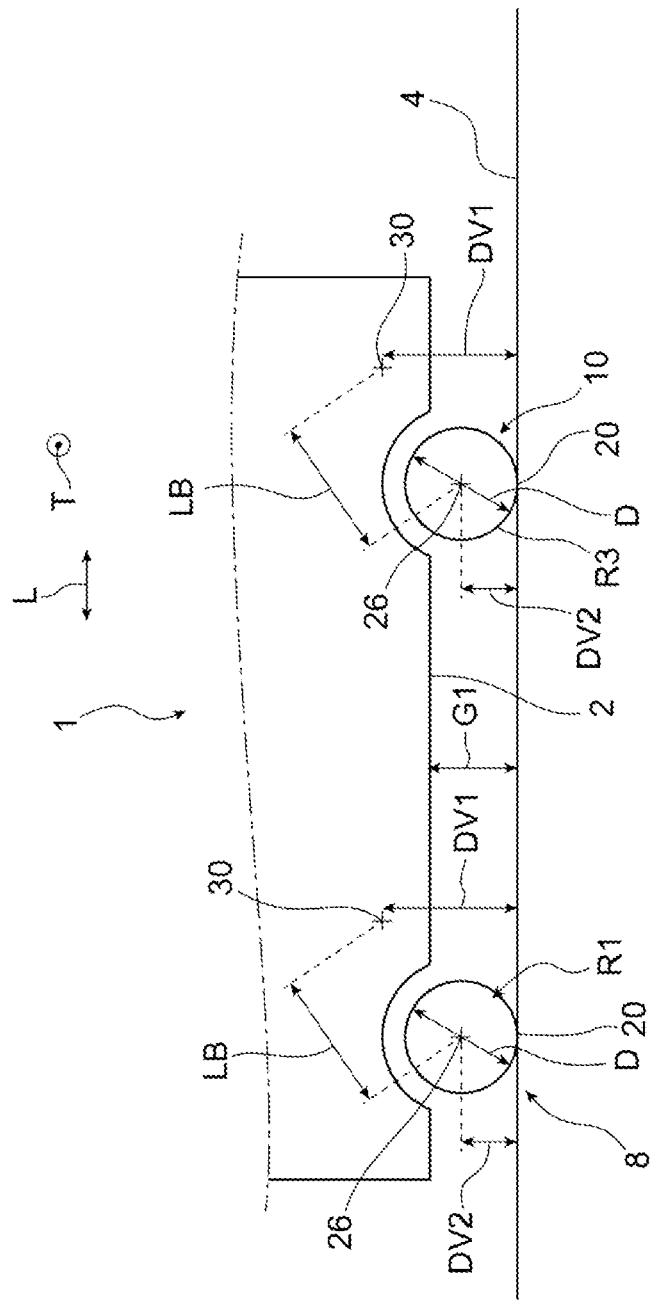
Figure 20:
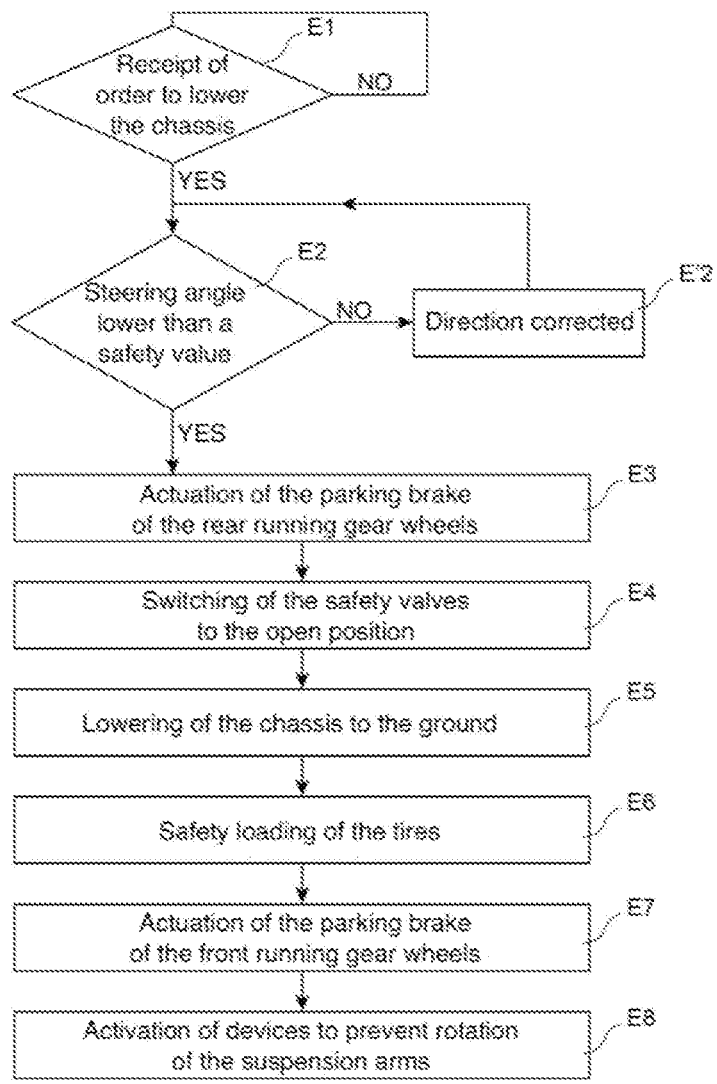

FIG. 6' shows a schematic side view of the vehicle, in the event of a failure of the actuator associated with one of the rear wheels of the vehicle;

FIG. 7 shows a view similar to that of FIG. 5, with the safety device shown in an active state as adopted when the suspension arm occupies its safety position of FIG. 6;

FIG. 8 shows a view similar to that of FIG. 6, with the chassis in its low position supported on the ground;

FIG. 9 shows a view similar to that of FIG. 7, with the safety device shown in an inactive state as adopted when the chassis occupies its low supported position of FIG. 8;

FIG. 10 shows a view similar to that of FIG. 4, with the vehicle according to a second preferred embodiment of the invention;

FIG. 11 shows the safety device associated with the wheel illustrated in FIG. 10, and shown in an active state as adopted with the chassis in the high running position of FIG. 10;

FIG. 12 shows a schematic view of another embodiment in which the safety devices, associated with the wheels of the vehicle, cooperate with one another to ensure an anti-roll function;

FIG. 13 is a schematic view similar to that of FIG. 12, with the safety devices also integrating the shock-absorbing function;

FIG. 14 shows a view similar to that of FIG. 4, with the safety device and the actuator integrated in the same assembly, the latter also being capable of integrating the damper;

FIG. 15 shows a perspective view of one of the wheels of the vehicle, according to an improved embodiment;

FIG. 16 shows a view similar to that of FIG. 5, with the safety device integrating an additional function of preventing rotation of the wheel suspension arm;

FIG. 16*a* is a view similar to that of FIG. 16, with the safety device presented according to an alternative;

FIG. 17 shows the vehicle with its chassis in the low position supported on a convex ground;

FIG. 18 shows a view similar to that of FIG. 12, with the safety devices integrating an additional function of preventing rotation of the wheel suspension arm;

FIG. 19 is a schematic side view of the vehicle, with its chassis in the high running position; and FIG. 20 is a schematic view showing different steps of a method for lowering the chassis illustrated in the previous figures.

Figure 1:
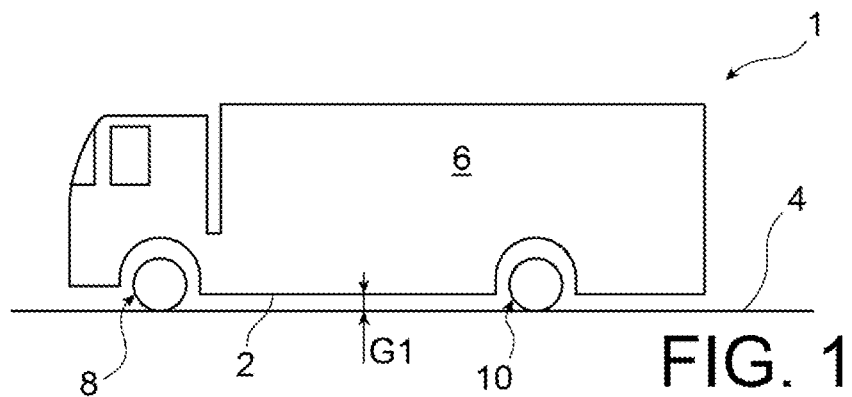
FIG. 1 shows a schematic side view of a vehicle according to the invention, with its chassis in the high running position.
Figure 2:
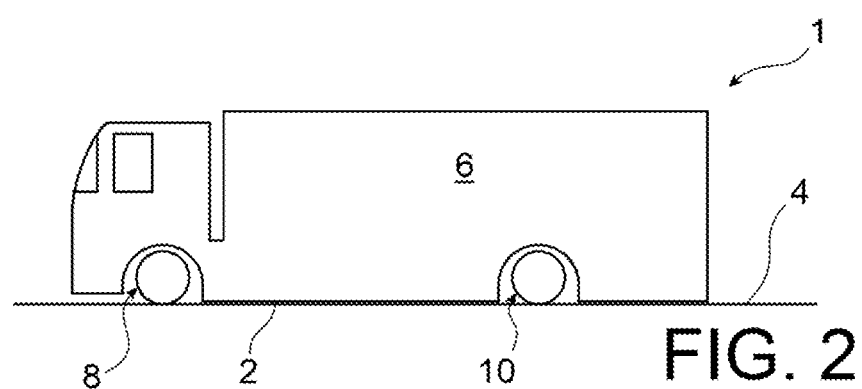
FIG. 2 shows a view similar to the previous one, with the chassis in the low position supported on the ground.
Figure 3:
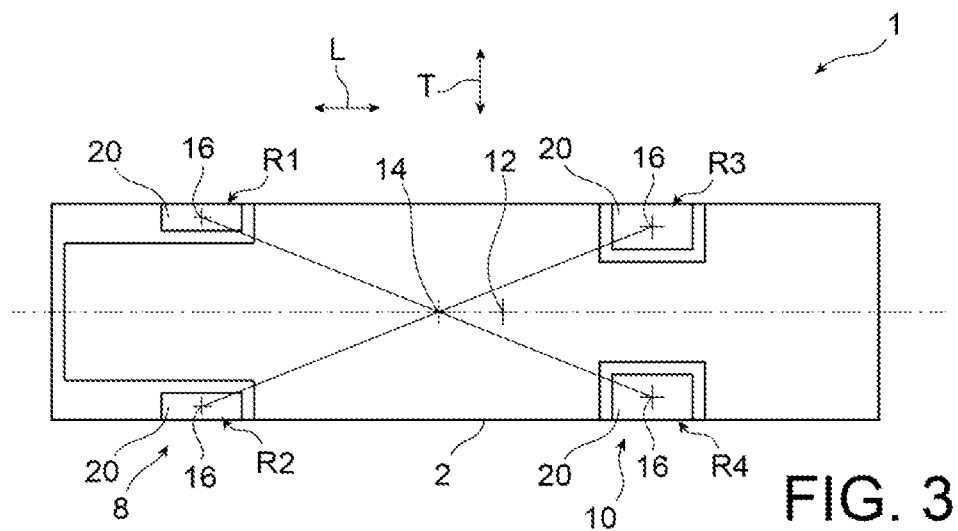
FIG. 3 shows a view from below the vehicle illustrated in FIGS. 1 and 2.

In reference first to FIGS. 1 to 3, a vehicle 1 according to the invention, of the type including a chassis 2 in a controlled vertical position, is shown. The vehicle 1, in this case preferably an urban delivery truck, in fact has a chassis 2 that can be raised to a high running position as shown in FIG. 1, and lowered to a low position supported on the ground 4, as shown in FIG. 2. It may nevertheless include other vehicles, preferably road transport vehicles.

The chassis 2, also referred to as "body", supports or delimits a cargo loading space 6. For example, this space 6 is delimited at the bottom by the chassis 2, to be as close as possible to the ground in the low supported position of the chassis.

In the high running position, the ground clearance G1 of the chassis 2 remains moderate, so as to limit the vertical travel required to reach the low position supported on the ground, adopted for unloading cargo. Typically, this ground clearance G1 is less than 500 mm, and preferably is between 150 and 500 mm.

The vehicle 1 includes only two running gears, namely a front running gear 8, and a rear running gear 10. Each of the two gears is equipped only with two single-wheel assemblies, each of these wheels being individually articulated on the chassis 2 by a suspension arm, as will be described below. Nevertheless, if each wheel is in this case associated with a single suspension arm, the design may be more complex. Indeed, there may, for example, be a front gear where the two wheels are on the same axle, itself articulated by "pushed" or "pulled" suspension arms, generally two per wheel and mounted at the top and bottom of the axle to create parallelogram kinematics. Thus, each of the wheels may be individually, or in pairs, articulated on the chassis 2 by at least one suspension arm in the "pushed" or "pulled" configuration.

The front gear 8 thus includes a left front wheel R1 and a right front wheel R2, while the rear gear 10 includes a left rear wheel R3 and a right rear wheel R4.

The loading space 6 has an extended rear cantilevered area. In practice, this leads to the observation, as shown in FIG. 3, that the vertical projection of the centre of gravity 12 of the loaded vehicle is located behind an intersection 14 between the two diagonals connecting the centres 16 of the treads 20 of the front and rear wheels R1-R4. In other words, the centre of gravity 12 of the loaded vehicle is located behind a wheelbase midpoint between the two running gears 8, 10. The term "loaded vehicle" in this case means that the loading space 6 is entirely occupied by cargo all having the same weight per unit area.

The longitudinal distance of the centre of gravity 12 with respect to the wheelbase midpoint corresponding to the intersection 14 between the diagonals can be approximately 50 cm to 1 m, and be up to 2 m. In this regard, it is noted that the vehicle 1 has a longitudinal direction referenced "L" in the figures, as well as a transverse direction referenced "T". In reference now to FIG. 4, an assembly between one of the wheels of the vehicle and the chassis 2 is shown. In this case, it is the left rear wheel R3, but it is understood that the assembly is identical or similar for each of the four wheels R1-R4. Thus, only the assembly of the wheel R3 will be described below.

It is first noted that the wheel R3 has a rim 22 as well as a tire 24 arranged around the rim. It is the tire 24 that defines the tread 20. The rim 22 is articulated according to a wheel rotation axis 26 on a suspension arm 28, having a general rectangular shape. The wheel R3 is articulated at one of the vertices of the arm 28. The latter is pivotably mounted at another of its vertices on the chassis 2, according to an arm rotation axis 30 parallel or substantially parallel to the wheel rotation axis 26. At the third vertex of the suspension arm 28, an end of an actuator 32 of the suspension arm is articulated. This articulation is produced according to an actuator rotation axis 34, parallel to the axes 26, 30. At its opposite longitudinal end, the actuator 32 bears on the chassis 2, or is also articulated on it. This actuator 32 makes it possible to control the angular position of the suspension arm 28 relative to the chassis 2, in order to vary the vertical position of the chassis as desired.

The actuator 32 is in this case of the air bag type. It is the control of its internal pressure that makes it possible to adjust its longitudinal span between the arm 28 and the chassis 2, which span determines the angular position of the arm 28. This pressure is regulated by a control unit 33 of the vehicle, which unit may be common to the four wheels, while being capable of delivering different control signals according to the wheels.

In FIG. 4, the angular position of the suspension arm 28 is such that it forms an angle A1 relative to the chassis 2, this angle A1 being determined in side view between the normal to the chassis or the vertical, and an imaginary line connecting the two axes 26, 30. The angle A1 adopted during vehicle running is, for example, approximately 90°, but it may obviously be smaller or larger. In addition, as the suspension arm 28 is preferably damped, the value of the angle A1 varies during damping phases encountered during running.

To achieve this damping of the suspension arm 28, a damper 36 is provided, of any design known to a person skilled in the art. The opposite ends of the damper 36 are articulated on the arm 28 and the chassis 2, according to axes also parallel to axes 26, 30 and 34.

Finally, the assembly is completed with a safety device specific to the invention, referenced 40 in FIG. 4. This safety device is capable of limiting the accidental lowering of the chassis 2 to the ground 4, by adopting an active state in which it limits the rotation of the suspension arm around the axis 30, in a first direction of rotation S1 corresponding to the clockwise direction in FIG. 4. It is effectively in this direction of rotation that the arm 28 lowers the chassis 2 toward the ground 4.

The safety device 40, shown only schematically in FIG. 4, is also articulated at its two opposite ends on the chassis 2 and on the suspension arm 28, according to axes of rotation 42, 44 parallel to axes 26, 30 and 34. In this case, the safety device 40 is distinct from the damper 36, but these two items of equipment can advantageously be merged, as will be described below.

In reference now to FIG. 5, the safety device 40 is shown in greater detail, still with its active state preventing the accidental lowering of the chassis to the ground. It comprises a hydraulic jack 46 having a cylinder 48 articulated on the suspension arm 28 according to the axis of rotation 42, and a piston 50 articulated on the chassis 2 according to the axis 44, or vice versa. The piston head 52 delimits on either side of it a first oil chamber 54, and a second oil chamber 56. The first chamber 54 is also defined by a first chamber bottom 58, while the second chamber 56 is also defined by a second chamber bottom 60, through which the rod of the piston 50 passes.

The first chamber 54 communicates with a first oil passage 62 produced laterally through the cylinder 48. It also communicates with a second oil passage 64 produced through the cylinder 48, this second passage being located near the first chamber bottom 58, and in any case closer to this bottom 58 than the first passage 62 is. The two passages 62, 64 are in fact spaced apart from one another in a direction of sliding 66 of the piston in the cylinder. The second passage 64 communicates with a first oil duct 68, while the first passage 62 communicates with a second oil duct 70 connected to the end of the first duct 68. Upstream of this connection, the first duct 68 is equipped with a safety valve 72, this valve being capable of being manual, but preferably being a solenoid valve controlled by the control unit 33.

The second chamber 56, for its part, communicates with a third oil passage 74 produced laterally through the cylinder 48, this third passage preferably being arranged near the bottom of the second chamber 60. The third passage 74 communicates with the end of a third oil duct 76, belonging to a fluid circuit 78, which will be described below. In fact, downstream of the safety valve 72 in the direction of flow of oil going from the second passage 64 to this safety valve 72, the first fluid duct communicates not only with the second duct 70 connected to the first passage 62, but also with the other end of the third oil duct 76 belonging to the fluid circuit 78. The latter is completed by a tap on the third duct 76, between its two ends, which tap leads to an oil tank 80 providing, in its upper portion, an air reserve 82.

In the active state of the safety device 40 as shown in FIG. 5, the valve 72 is kept in the closed position. In this state, the oil may not pass through the second passage 64, due to the closure of the valve 72. However, the oil may circulate freely between the two chambers 54, 56 via the first opening 62, the second duct 70, the third duct 76, and the third passage 74. Therefore, the piston 50 may accompany the movements of the damper during running, by a movement of the piston head 52 between the first and third passages 62, 74. In particular, in this active state of the safety device 40, the piston 50 can stop its travel in direction 66 to prevent an excessive lowering of the chassis, and thus prevent an undesired impact thereof on the ground during running. More specifically, in the event of a failure of the actuator associated with the wheel R3, the weight of the chassis 2 and the load of the vehicle cause a rotation of the suspension arm 28 according to axis 30 in the first direction S1, schematically represented by the arrow in FIG. 6. The undesired rotation of the suspension arm 28 causes a movement of the piston head 52 toward the bottom 58, expelling the oil from the first chamber 54 via the first passage 62 toward the second chamber 56 via ducts 70, 76 and the third passage 74.

When the piston head 52 reaches the first passage 62 formed through the cylinder 48, the oil can no longer escape from the first chamber 54 through this same passage 62 due to the blocking thereof by the piston head, just as the oil cannot escape through the second passage 64, due to the closure of the safety valve 72. The piston 50 is thus locked in a safety position as shown in FIG. 7, at a distance from the bottom 58, by virtue of the pressurization of the oil between the piston head 52 and the valve 72.

This locking of the piston 50 in the safety position advantageously stops the accidental rotation of the suspension arm 28 with respect to the chassis 2, in direction S1. This arm 28 is then kept in its safety position shown in FIG. 6, which locally provides a non-zero ground clearance G2 so as to prevent accidental contact with the ground. In this angular position of the arm 28, the latter forms an angle A2 with the normal to the chassis 2, this angle A2 obviously being smaller than the angle A1 described above in reference to FIG. 4.

It is noted that, in the event of a failure of the actuator associated with one of the rear wheels R3, the chassis 2 has a tendency to be tilted with respect to the ground 4, as schematically shown in FIG. 6'. The rear cantilevered portion must also avoid coming into contact with the ground 4. Therefore, the ground clearance G2 locally provided at the rear wheel R3, by virtue of its safety device, must be sufficient to maintain a non-zero ground clearance G3 at the rear end of the rear cantilevered portion of the vehicle. In addition, the theoretical value of G2 for maintaining a non-zero ground clearance G3 may in practice be increased, so as to take into account any dynamic movements of the vehicle, during running under such conditions of failure of the actuator of the rear wheel. The theoretical value of G2 can, for example, by increased by 10, 40 or 60%, and this increase is thus taken into account in the design of the safety devices associated with the wheels. Similar reasoning is applied to prevent the risk of contact of the front cantilevered portion of the vehicle with the ground during a failure of an actuator associated with a front wheel.

The safety device 40 may alternatively adopt an inactive state as shown in FIGS. 8 and 9, in which the valve 72 is in the open position. In this state adopted for deliberately lowering the chassis 2 to the ground, the oil can be extracted from the first chamber 54 even after the piston head passes through the first passage 62, via the second passage 64 located near the bottom 58. This allows for additional travel of the piston 50 beyond the first passage 62, to accompany an additional rotation of the arm 28, making it possible to bring the chassis 2 to the ground 4. When the chassis 2 reaches the ground, the arm 28 is in an angular position so that it forms an angle A3 with the normal to the chassis 2, this angle A3 shown in FIG. 8 obviously being smaller than the angle A2 described above in reference to FIG. 6.

In reference now to FIGS. 10 and 11, a second preferred embodiment is shown in which the safety device 40 is integrated in the damper 36, or vice versa. In other words, a single assembly satisfies both functions of safety and damping, this assembly being articulated at its ends at two points, respectively on the suspension arm 28 and the chassis 2, according to axes 42 and 44. To obtain this assembly satisfying the two functions, the jack of the damper is formed by the jack 46 of the safety device 40, or vice versa.

The second embodiment uses the same features as the first embodiment, to which equipment is added in the fluid circuit 78. The third duct 76 of this circuit is in fact equipped with a loop 84 arranged between the tap of the tank 80, and the connection thereof to the third passage 74. This loop 84 integrates elements for satisfying the damping function. To this end, it integrates, in a main duct 90*a*, a first non-return valve 86*a*, associated with a compression fluid through-opening 88*a*. The loop also has a duct 90*b* for bypassing the compression fluid through-opening 88*a*, this duct 90*b* being equipped with a second non-return valve 86*b* associated with an expansion fluid through-opening 88*b*.

With this arrangement, the second non-return valve 86*b* allows a flow of oil in a direction opposite that of the first non-return valve 86*a*. Therefore, during the damping phase, the oil passes through the main duct 90*a*, while during the rebound phase, the oil passes through the bypass duct 90*b*. During the compression phase, the oil passes through the compression fluid through-opening 88*a*, which is calibrated so as to ensure a dissipation of energy and damping by wire-drawing of the oil. Similarly, in expansion, the damping is determined by the passage of the oil through the other through-opening 88*b*. Consequently, by ensuring that the two openings 88*a*, 88*b* have different flow cross-sections, a differentiated damping in compression and in rebound is obtained.

According to another embodiment shown in FIG. 12, the safety devices 40 of the different wheels of the vehicle can cooperate in pairs to confer an anti-roll function. FIG. 12 shows the cooperation of the devices 40 for the two wheels R3, R4 of the rear running gear, but an identical or similar cooperation can be adopted for the two wheels of the front running gear.

More specifically, the end of the third duct 76 of the safety device 40 associated with the left rear wheel R3 no longer communicates with the third passage 74 of the jack 46 of this device 40, but it communicates with the third passage 74 of the jack 46 belonging to the safety device 40 associated with the right rear wheel R4, transversely opposite the left rear wheel R3. Therefore, when the piston 50 of the right rear wheel R4 descends into its cylinder 48 following a rotation of the suspension arm of this wheel R4, the oil of the first chamber of the jack 54 associated with the wheel R4 is expelled toward the second chamber 56 of the jack associated with the other wheel R3. Simultaneously, the oil of the first chamber of the jack 54 associated with the wheel R3 is expelled toward the second chamber 56 of the jack associated with the wheel R4. The piston 50 of the jack associated with the wheel R3 therefore also descends, preventing or limiting unwanted rolling movements of the vehicle.

Such a functionality is even more relevant when the safety devices 40 also integrate the damping function, as shown in FIG. 13. According to an alternative embodiment shown in FIG. 14, applicable to all modes and all embodiments described, the actuator 32 in the form of an air bag is integrated in an assembly incorporating the safety device 40, with the latter also being capable of incorporating the damping function in the sense described in reference to FIGS. 10 and 11. To do this, the longitudinal axis 92 of the air bag merges with an axis of the jack 46 of the safety device 40. In addition, a longitudinal end of the air bag 32 is secured to the cylinder 48, while its opposite longitudinal end is pivotably mounted on the chassis 2, according to an axis of rotation 44. The rod of the piston 50, in turn, is pivotably mounted on the suspension arm 28, according to the axis of rotation 42. With this particular arrangement, the bearing face of the air bag 32 remains permanently centred on the cylinder 48, and more specifically on the bottom 60 of the second chamber of the jack. The air bag 32 thus remains permanently aligned with the jack 46, which ensures an optimal transfer of mechanical force between the chassis 2 and the suspension arm 28, regardless of the angular position of the latter.

In reference now to FIG. 15, an improved embodiment of one of the wheels is shown. It is the wheel R3, but all of the wheels of the vehicle can be produced in this way. This wheel R3 comprises, in addition to the rim 22 and the tire 24 defining the tread 20, a reinforcement 96 radially arranged around the rim. The reinforcement 96 is intended to be contacted by an interior portion of the tread 20 of the tire, in the event of a pressure loss, thus preventing direct contact between the tire 24 and the rim 22. It is designed to be rigid so as not to collapse under the weight of the vehicle, thus helping to prevent the risk of accidental lowering of the chassis to the ground, in the event of a pressure loss of the tire, for example resulting from a puncture. Preferably, in the design of the safety devices 40, the possible collapse of the chassis caused by a loss of pressure of the tire can also be taken into account. Thus, the ground clearance G2 provided locally at the wheel by its safety device is preferably greater than the maximum amplitude of collapse of the wheel, following a pressure loss in the tire that may result from deflation or a blowout. Similarly, the principles defined above in reference to FIG. 6' are also applicable to a cumulative situation of failure of an actuator associated with one of the wheels, and a loss of pressure in this wheel leading to rolling on the reinforcement 96. In other words, it is ensured that the value of the ground clearance G2 provided locally at the rear wheel R3 by its safety device, subtracted from the value of the maximum amplitude of collapse of the wheel following a loss of pressure in the tire, is sufficient to maintain a non-zero ground clearance G3 at the rear end of the rear cantilevered portion of the vehicle. In this case again, an analogous condition is presented for the front wheels.

In reference to FIG. 16, a third preferred embodiment of the invention is shown, in which each wheel is associated with a device for preventing rotation of the wheel suspension arm, this device for preventing rotation being, in this case, integrated with the safety device 40. It takes the form of a blocking valve 98, preferably a solenoid valve controlled by the control unit. A manually actuated blocking valve may also be envisaged without going beyond the scope of the invention. The blocking valve 98 is arranged in the fluid circuit 78, on the third duct 76 near the connection with the first and second ducts 68, 70.

When the blocking valve 98 is in the blocking position, and the safety valve 72 also adopts its closed position, no fluid communication is possible between the two chambers 54, 56 of the jack 46. Consequently, once these two valves 72, 98 are closed, the piston 50 remains locked in its position in the cylinder 48. In other words, the piston 50 can no longer move in the sliding direction 66, regardless of the direction of movement. The locking of the position of the piston 50 prevents the rotation of the suspension arm with respect to the chassis, in both directions of rotation. This functionality is particularly beneficial when the chassis 2 is in its low position supported on a ground 4 that is not flat. Such a situation has been shown schematically in FIG. 17, showing the front portion of the chassis 2 in contact with the ground, while the rear portion thereof remains at a distance from the ground due to the convex character of the road. In this situation, there is a risk of movement of the centre of gravity of the vehicle, for example as cargo is unloaded. This movement of the centre of gravity may cause an undesired tilting of the chassis 2, for example diminishing the initial clearance J between the chassis 2 and the convex road 4. Such an unwanted tilting would present a risk to people positioned near the front portion of the chassis of the vehicle, such as, for example, a risk of a foot being crushed between the ground and this front portion of the chassis approaching the ground.

However, by virtue of the blocking valves 98, preferably provided in the safety device 40 of each of the wheels, such risks are avoided for people located near the vehicle.

It is noted that the blocking valve 98 can be arranged in another location on the third duct 76, for example near the third oil passage 74 through the cylinder 48, as is shown in FIG. 16a. Moreover, this principle of arrangement of the blocking valve 98 for preventing rotation of the suspension arm also applies to cases in which the safety device 40 integrates the damping function described in reference to FIG. 11. In this case, the blocking valve 98 can be arranged upstream or downstream of the loop 84, without going beyond the scope of the invention. This principle of arrangement of the blocking valve 98 for preventing rotation of the suspension arm is also applicable to cases in which the safety device 40 integrates the anti-roll function, as is schematically shown in FIG. 18.

As an example, the invention provides at least one embodiment in which the safety device associated with each wheel integrates a plurality of additional functions described above, or even all of them, namely the damping function, the anti-roll function, the function of integrating the actuator, and the function of preventing rotation of the suspension arm by preventing a translation movement of the piston.

Other preferred features of the invention will be described below, and they can obviously be combined with those described above.

First, in reference to FIG. 19, the vehicle 1 is shown in the running configuration, that is, with its chassis 2 in the high running position defining the ground clearance G1. The distinctiveness of the vehicle here lies in the fact that the kinematics associated with each of the four wheels are identical. More specifically, these identical kinematics allow for an identical or substantially identical longitudinal offset of the chassis 2 with respect to the ground 4 when the chassis is being lowered. By virtue of this design, the lowering of the chassis to its low position supported on the ground does not generate any stress in the running gears 8, 10, even when all of the wheels are locked by a parking brake during this lowering.

For each of the four wheels R1-R4 (only the two wheels R1 and R3 being visible in the side view of FIG. 19), in the high running position of the chassis, the following features are observed:

the suspension arm 28 has an arm length "LB" defined between the two rotation axes 26, 30;

the arm rotation axis 30 has a first vertical distance to the ground "DV1";

the wheel rotation axis 26 has a second vertical distance to the ground "DV2" less than the first; and the wheel includes a tread 20 having a wheel diameter "D".

Thus, to avoid the introduction of stresses in the running gears 8, 10 when the chassis is being lowered, the following indications apply with regard to the four wheels:

- the arm rotation axis 30 is longitudinally offset from the wheel rotation axis 26 in the same direction, in this case toward the rear leading to a "pushed" arm configuration, even if a reverse "pulled" arm configuration can also be envisaged, without going outside the scope of the invention;
- the arm length LB is the same or substantially the same;
- the first vertical distance to the ground DV1 is the same or substantially the same;
- the second vertical distance to the ground DV2 is the same or substantially the same; and
- the wheel diameter D is the same or substantially the same.

When all of these values are not strictly identical, the deviations tolerated are such that, when they are combined, the difference in longitudinal offset imparted on the chassis between the lowest offset among the four wheels and the highest offset does not exceed 5 cm, or even 2 or 3 cm.

This low offset deviation can in fact be absorbed by a moderate sliding of the tires on the ground during lowering, without producing detrimental stresses on the running gears, even with the four wheels locked by the parking brake.

FIG. 20 schematically shows the different steps of a method for lowering the chassis 2 of the vehicle, particularly suitable when all of the wheels do not have the same movement kinematics during the lowering, unlike the mode described in reference to FIG. 19. Nevertheless, the method is also applicable to this mode, without going outside the scope of the invention.

The method begins with a step E1 of waiting to receive an order to lower the chassis. This order may be triggered by an operator, for example via a dedicated dashboard button or any other button linked to the control unit 33 of the vehicle.

When such a lowering order is received, step E2 consists in verifying that the wheels of the front gear do not have an excessive steering angle, because otherwise this may cause the vehicle to pivot during lowering of the chassis. Thus, if the steering angle is greater than a safety value, a step E'2 is implemented in order to correct the direction until an appropriate steering angle is obtained. This step E'2 may be carried out in an automated manner by virtue of a power steering system, or manually by the operator acting directly on the steering wheel of the vehicle.

When the steering angle is below the safety value, step E3 can be implemented, said step consisting in actuating the parking brake only for wheels R3, R4 of the rear running gear. Once this parking brake has been activated on the rear running gear and kept deactivated on the front running gear, step E4 involves switching all of the safety valves 72 from their closed position to their open position, so as to place the safety devices 40 in the inactive state. Step E5 then consists in lowering the chassis 2, by controlling the actuators 32, always via the unit 33 of the vehicle. In addition, this unit 33 can be programmed to successively implement all of the steps of this method, automatically, that is, without intervention by the operator.

The lowering step E5 is continued until the chassis 2 rests on the ground 4, in its low supported position. To avoid an excessively weak grip of the vehicle on the ground when the chassis is in the low position supported on the ground, a step E6 of safety loading the tires of the wheels may be carried out. This optional step aims to ensure that the tires are not entirely unloaded after the chassis has been supported on the ground. It is implemented, for example, by operating a lifting control of the chassis 2 via the actuators 32, so as to produce a slight relative vertical movement between the chassis and the axis of rotation of each wheel. This vertical movement does not normally exceed more than several millimetres, so as to avoid a loss of contact between the chassis 2 and the ground 4. Nevertheless, the loading of the tires on the ground reinforces the overall grip of the vehicle in the low supported position of the chassis. The risks of sliding of the vehicle are reduced, which is particularly advantageous when the chassis is lowered onto a sloping ground.

Once the lowering has been carried out, step E7 may be implemented, said step consisting in actuating the parking brake for the wheels R1, R2 of the front running gear, with the parking brake kept activated for the rear gear wheels. Once this parking brake has been activated on the front running gear, the final step E8 involves activating devices 98 for preventing rotation of the wheel suspension arms 28, so as to avoid risks of unwanted movements of the chassis during cargo unloading/loading operations.

The order of some of these steps may nevertheless be reversed. For example, step E7 of actuation of the parking brake for the wheels R1, R2 of the front running gear may be carried out after step E8 of activating the devices 98 for preventing rotation of the wheel suspension arms 28, without going outside the scope of the invention. The same applies to steps E3 and E4, or to steps E2-E'2 and E3.

Of course, various modifications may be made by a person skilled in the art to the invention described above solely as non-limiting examples, and of which the scope is delimited by the appended claims. In particular, the features of the different modes and different embodiments and alternatives may be combined without going outside the scope of the invention.

The invention claimed is:

1. A vehicle comprising a controlled vertical position chassis in order to be moved between a high running position and a low position wherein the chassis is supported on the ground, the vehicle also including a plurality of wheels and, associated with each wheel:
   - a wheel-bearing suspension arm, the arm being pivotably mounted on the chassis;
   - a suspension arm actuator, arranged between the suspension arm and the chassis, the actuator being configured to control an angular position of the arm relative to the chassis, in order to vary the vertical position of the chassis,
   - a safety device capable of limiting the accidental lowering of the chassis, the device being capable of adopting an active state to limit the rotation of the suspension arm, in a first direction leading to the lowering of the chassis, to a safety position of said arm, and, an inactive state to allow the rotation of said arm in the first direction, beyond the safety position,
   - wherein the safety device comprises a jack having a cylinder mounted on the chassis and a piston mounted on the suspension arm, or vice versa, the jack defining a first chamber communicating with a first and a second fluid passage through the cylinder, spaced apart from one another in a direction of sliding of the piston in the cylinder so that the second passage is located as close as possible to a bottom of the first chamber defined by the cylinder, the second passage communicating with a first fluid duct provided with a safety valve adopting:

an open position in the inactive state of the safety device, so as to allow the fluid to be discharged from the first chamber through the second passage, when the piston moves toward the bottom of the first chamber due to the rotation of the suspension arm in said first direction; and a closed position in the active state of the safety device, so that when the piston moves toward the bottom of the first chamber, due to the rotation of the suspension arm in said first direction, the piston is locked in a safety position at a distance from the bottom of the first chamber, in which position the fluid is compressed between the piston head and the safety valve.

2. The vehicle according to claim 1, wherein, associated with each wheel, the vehicle has a damper arranged between the chassis and the wheel suspension arm.

3. The vehicle according to claim 2, wherein the damper is formed by an element distinct from the safety device.

4. The vehicle according to claim 2, wherein the safety device is integrated in the damper, the latter comprising a jack formed by the jack of the safety device.

5. The vehicle according to claim 1, wherein the jack defines a second chamber separated from the first chamber by the piston head, the second chamber communicating with a third fluid passage through the cylinder, and wherein, downstream of the safety valve in the direction of flow going from the second passage to the safety valve, the first fluid duct communicates with a second fluid duct connected to the first passage, and with a fluid circuit.

6. The vehicle according to claim 5, wherein the fluid circuit communicates with the third fluid passage through the cylinder.

7. The vehicle according to claim 5, wherein the fluid circuit communicates with the third fluid passage of the jack belonging to the safety device associated with the wheel of the vehicle located opposite in a transverse direction of the vehicle.

8. The vehicle according to claim 5, wherein the fluid circuit has a first non-return valve associated with a compression fluid through-opening, as well as a duct for bypassing the compression fluid through-opening, the bypass duct being equipped with a second non-return valve associated with an expansion fluid through-opening, the second non-return valve allowing a flow of fluid in the direction opposite that of the first non-return valve, and the compression fluid through-opening having a different flow cross-section from that of the expansion fluid through-opening.

9. The vehicle according to claim 5, wherein the fluid circuit includes a fluid tank with an air reserve.

10. The vehicle according to claim 1, wherein the suspension arm actuator is an air bag having a longitudinal axis merging with an axis of the jack of the safety device, a longitudinal end of the air bag being secured to one of the two elements of the jack among the cylinder and the piston the other of the two elements of the jack being mounted on one of the two entities among the suspension arm and the chassis chassis, and the opposite longitudinal end of the air bag being mounted on the other of the two entities among the suspension arm and the chassis.

11. The vehicle according to claim 1, wherein the jack is a hydraulic jack.

12. The vehicle according to claim 1, wherein each wheel has a rim and a tire, as well as a reinforcement arranged around the rim and intended come into contact with a tread of the tire in the event of a pressure loss.

13. The vehicle according to claim 1, comprises at least one of the following features:

the vehicle includes only two running gears, namely a front running gear and a rear running gear each equipped with only two single-wheel assemblies, each of these wheels being individually articulated on the chassis by its suspension arm;

the vehicle has, in the running configuration, a ground clearance of less than 500 mm;

when viewed from below, the centre of gravity of the loaded vehicle is located behind a wheelbase midpoint between a front running gear and a rear running gear;

the vehicle has a cargo loading space, and is preferably an urban delivery truck.

14. The vehicle according to claim 1, comprising, associated with each wheel, a device for preventing rotation of its suspension arm, the device for preventing rotation being configured to prevent the rotation of the suspension arm with respect to the chassis in both directions of rotation, when the chassis is in the low position supported on the ground.

15. The vehicle according to claim 5, wherein the device for preventing rotation of the suspension arm is a blocking valve forming an integral part of the fluid circuit of the safety device, said valve preventing, in a blocking position, the movement of the piston in the cylinder, in both of the sliding directions thereof.

16. The vehicle according to claim 1, wherein, for each wheel of the vehicle, in the high running position of the chassis:

its suspension arm has an arm rotation axis with respect to the chassis;

the wheel has a wheel rotation axis with respect to the suspension arm, the two arm rotation and wheel rotation axes being parallel or substantially parallel;

its suspension arm has an arm length defined between the arm rotation and wheel rotation axes;

the arm rotation axis has a first vertical distance to the ground;

the wheel rotation axis has a second vertical distance to the ground; and the wheel includes a tread having a wheel diameter, and wherein, for all of the wheels:

the arm rotation axis is longitudinally offset from the wheel rotation axis in the same direction;

the arm length is the same or substantially the same;

the first vertical distance to the ground is the same or substantially the same;

the second vertical distance to the ground is the same or substantially the same; and the wheel diameter is the same or substantially the same.

17. A method for lowering, to the ground, chassis of a vehicle according to claim 1, wherein it comprises a step of switching the safety valve of each wheel from its closed position to its open position, then a step of controlling the actuators in order to lower the chassis toward the ground.

18. The method according to claim 17, implemented with a vehicle including only two running gears, namely a front running gear and a rear running gear, each wheel of the running gears being associated with a parking brake, wherein it comprises the following series of steps:

when the chassis is in the high running position, actuation of the parking brake only for all of the wheels of one of the two running gears;

lowering of the chassis to its low position supported on the ground; and actuation of the parking brake for all of the wheels of the other of the two running gears.

* * * * *